(12) United States Patent
Hélot

(10) Patent No.: US 10,710,458 B2
(45) Date of Patent: Jul. 14, 2020

(54) MOTOR VEHICLE WITH A CONTROL PANEL MODULE

(71) Applicant: AUDI AG, Ingolstadt (DE)

(72) Inventor: Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 219 days.

(21) Appl. No.: 16/063,960

(22) PCT Filed: Dec. 15, 2016

(86) PCT No.: PCT/EP2016/081104
§ 371 (c)(1),
(2) Date: Jun. 19, 2018

(87) PCT Pub. No.: WO2017/108552
PCT Pub. Date: Jun. 29, 2017

(65) Prior Publication Data
US 2019/0337388 A1 Nov. 7, 2019

(30) Foreign Application Priority Data

Dec. 22, 2015 (DE) .................. 10 2015 226 586

(51) Int. Cl.
*B60K 37/06* (2006.01)
*B60K 35/00* (2006.01)
*B60H 1/34* (2006.01)

(52) U.S. Cl.
CPC .............. *B60K 37/06* (2013.01); *B60K 35/00* (2013.01); *B60H 1/34* (2013.01);
(Continued)

(58) Field of Classification Search
None
See application file for complete search history.

(56) References Cited

U.S. PATENT DOCUMENTS 8,322,769 B2 * 12/2012 Kuhlmann ............ B60K 37/06
296/24.34
10,351,001 B2 * 7/2019 Beauregard ........... B60K 37/04
(Continued)

FOREIGN PATENT DOCUMENTS

DE        3310886 A1    9/1984
DE   19 645 675 A1    5/1998
(Continued)

OTHER PUBLICATIONS

Office Action for German Patent Application No. 102015226586.2 dated Nov. 15, 2016.
(Continued)

*Primary Examiner* — Drew J Brown
(74) *Attorney, Agent, or Firm* — Staas & Halsey LLP

(57) ABSTRACT

Arranged between a steering wheel (or more generally, steering handle) and a windshield of a motor vehicle, a control panel module has at least on e operator control element, each arranged on one side of a steering column of the steering wheel. The at least one operator control element is rotatable about an axis of rotation and/or movably at least along a longitudinal direction of the motor vehicle with respect, to a driver's seat. An actuator device of the control panel module respectively moves the at least one operator control element response to a control device of the control panel module, depending on at least one enable signal, into an enable position and, depending on at least one position signal, from the enable position into position corresponding in each case the position signal.

21 Claims, 9 Drawing Sheets

(52) U.S. Cl.
CPC .......... *B60K 2370/1438* (2019.05); *B60K 2370/197* (2019.05); *B60K 2370/67* (2019.05); *B60K 2370/685* (2019.05)

(56) References Cited

U.S. PATENT DOCUMENTS

| | | | |
|---|---|---|---|
| 2008/0150307 A1 | 6/2008 | Quigley et al. | |
| 2009/0128307 A1 | 5/2009 | Hentsch et al. | |
| 2011/0006892 A1* | 1/2011 | Karpinsky | B60K 35/00 340/461 |
| 2014/0043269 A1 | 2/2014 | Kuhn et al. | |
| 2016/0193923 A1* | 7/2016 | Kim | B60K 35/00 296/70 |
| 2016/0193924 A1* | 7/2016 | Kim | G06F 1/1601 296/70 |
| 2019/0092170 A1* | 3/2019 | Gassman | B60R 11/0235 |
| 2020/0062118 A1* | 2/2020 | Wall | B60K 35/00 |

FOREIGN PATENT DOCUMENTS

| | | |
|---|---|---|
| DE | 101 41 506 A1 | 4/2003 |
| DE | 102007020929 A1 | 11/2008 |
| DE | 102012005674 A1 | 4/2013 |
| DE | 102012010884 A1 | 12/2013 |
| DE | 102013004462 B3 | 9/2014 |
| DE | 102015226586.2 | 12/2015 |
| FR | 2 315 408 A1 | 1/1977 |
| WO | 2013/117205 A1 | 8/2013 |
| WO | PCT/EP2016/081104 | 12/2016 |

OTHER PUBLICATIONS

International Search Report for PCT/EP2016/081104 dated Feb. 23, 2017.
English Translation by WIPO of the International Preliminary Report on Patentability completed Mar. 26, 2018 in corresponding International Patent Application No. PCT/EP2016/081104, 7 pp.

* cited by examiner

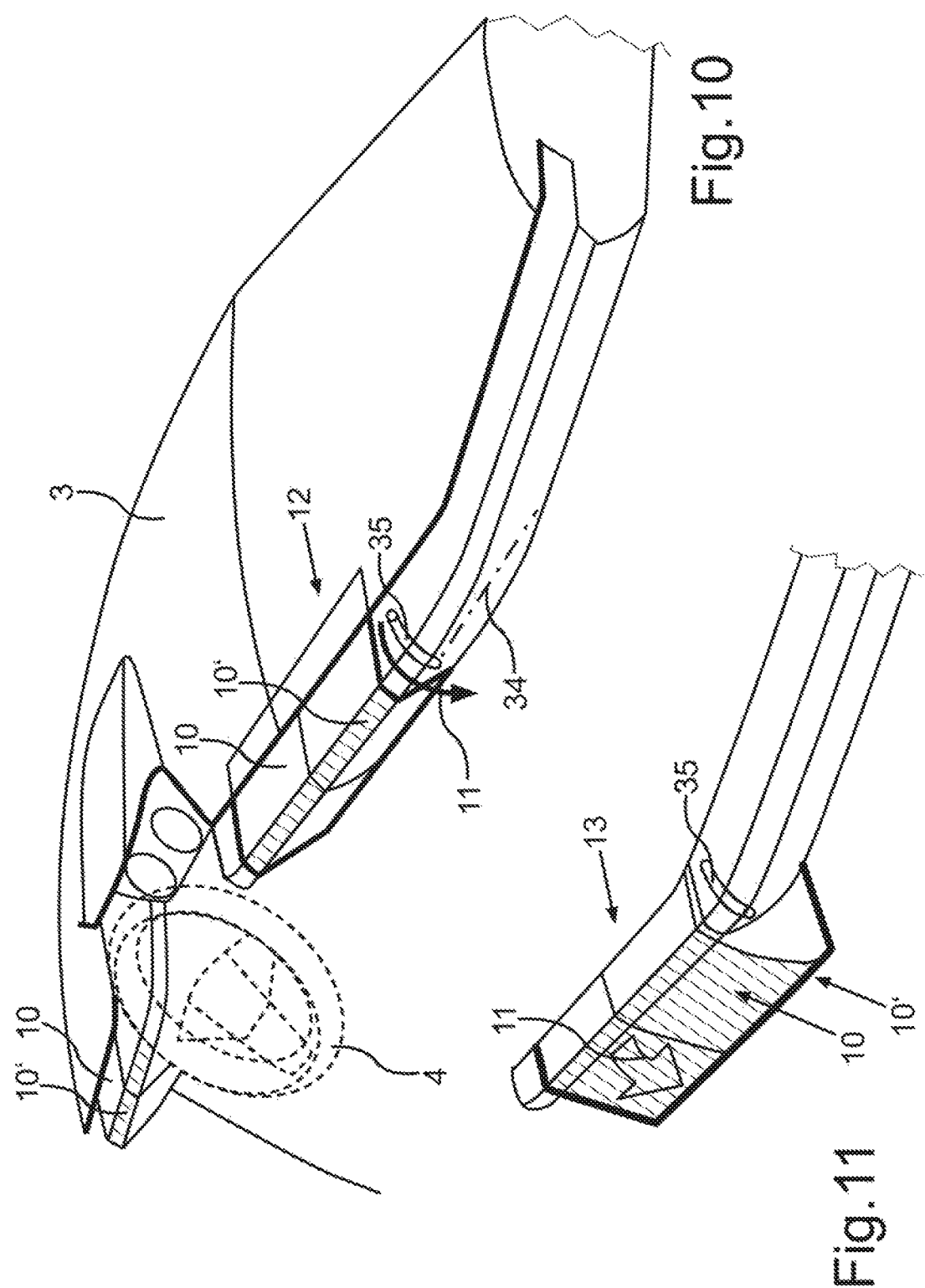

MOTOR VEHICLE WITH A CONTROL PANEL MODULE

CROSS REFERENCE TO RELATED APPLICATIONS

This application is the U.S. national stage of International Application No. PCT/EP2016/081104, filed Dec. 15, 2016 and claims the benefit thereof. The International Application claims the benefits of German Application No. 10 2015 226 586.2 filed on Dec. 22, 2015, both applications are incorporated by reference herein in their entirety.

BACKGROUND

Described below is a motor vehicle with a control panel module which is arranged in the region of a combination instrument between a steering handle of the motor vehicle and a front windshield of the motor vehicle. The control panel module has at least one operator control element, wherein each operator control element is arranged on one side next to a steering column of the steering handle and can extend in an elongate wing shape away from the steering column.

From the driver's point of view, behind a steering wheel next to the combination instrument for displaying operational data of the motor vehicle it is also possible to make available operator control elements which are therefore located directly within the reach of the driver's hands during the steering of the motor vehicle, when the driver holds his hands on the steering wheel. For example, the switching element for switching the vehicle lights is often arranged in the area behind the steering wheel.

The area has proven particularly favorable for making available operator control elements, since here safe grasping around the steering wheel is necessary only over a relatively short distance to an operator control element. Therefore, it is desired to utilize the region between the steering handle, for example the steering wheel, and the front windshield better for making available operator control elements.

DE 10 2007 020 929 A1 discloses arranging, on a steering wheel in a motor vehicle, an input device which can be rotated about the steering wheel axis and can be positioned fixedly in terms of location in any rotational position. It is disadvantageous here that the area for making available operator control elements is limited, since the input device is arranged between the steering wheel and the driver and makes operating the steering wheel difficult when there is an excessively large configuration.

US 2014/0043269 A1 discloses a motor vehicle which has a touchscreen which can be displaced on a rail horizontally along a vehicle transverse direction between the driver and the front seat passenger, in order to be able to be operated by these two persons. The rail is arranged on a control panel of the motor vehicle. A disadvantage of this solution is that the touchpad cannot be displaced to any desired extent behind the steering wheel because it then is blocked the view of the combination instrument, that is to say the display device, which the driver must be able to see through the spokes of the steering wheel.

SUMMARY

Efficient use of the space between the steering wheel and the front windshield of the motor vehicle makes available operator control elements which can be adapted in a flexible way as a function of the driving mode (getting into the vehicle, driving by the driver, pilot driving) and/or to a sitting position and physical stature of the driver.

Described below is a motor vehicle having a control panel module which is arranged between a steering handle and a front windshield and has at least one operator control element. Another term for control panel is also dashboard. In the following, a steering handle is to be understood as being, in particular, a steering wheel or some other grip element which is provided for a driver for performing transverse guidance of the motor vehicle and/or which is mounted in a rotatable fashion on a steering column which is arranged in a rotatably fixed fashion in the motor vehicle. A steering column is therefore to be understood as being that rotationally fixed part on which the steering handle is rotatably mounted. Each operator control element is arranged in each case on a side next to the steering column of the steering handle, that is to say to the right or left next to the steering column viewed from the driver's perspective.

The at least one operator control element of the control panel module is arranged or mounted in each case so as to be rotatable about a rotational axis and/or so as to be movable at least along a vehicle longitudinal direction of the motor vehicle with respect to a housing of the control panel module, and therefore with respect to a driver's seat of the motor vehicle. Correspondingly, in the case of the control panel module an actuator device for moving the at least one operator control element is also made available. The actuator device can have, for example, an electric motor for this purpose. A control device of the control panel module is designed to move, by activating the actuator device, the at least one operator control element, in each case as a function of an at least enable signal, into an enable position. An enable position is intended to mean here that space which is available for the driver in the passenger compartment is maximized, or the operator control element is stored or concealed when the at least one operator control element is located in each case in its enable position. The control device is also configured to move, as a function of at least one position signal, the at least one operator control element in each case out of its enable position and into a position of use which corresponds to the respective position signal, such as closer to the driver's seat. The corresponding position of use is intended to mean that a predetermined position signal is predefined or defined for each position of use. There can also be provision that just a single position signal is predetermined, which position signal causes the actuator device to move the at least one operator control element into a corresponding position of use closer to the driver's seat. However, a plurality of position signals can also be provided for different positions of use, each of which is arranged closer to the driver's seat than the enable position.

An advantage is that display units and/or activation units (e.g. switches) can be made available to the driver between the steering handle and the front windshield with each operator control element, which display units and/or activation units can be presented or offered to the driver near to his hand during driving while the driver holds the steering handle, by setting a corresponding position of use. However, in this context the free space of the driver is reduced by the enlarged number of display units and/or activation units. For this purpose, the enable position is assumed by the at least one operator control element as a function of the at least one enable signal, with the result that free space is available to the driver for movement, for example for getting out of the vehicle. On such an operator control element, for example, the operator control of the lights and/or the driver assistance by corresponding activation units can be made possible. A further operator control element can be made available, for example, for the operator control of the infotainment system (information entertainment system) and/or the air conditioning device.

There are also optional developments, the features of which result in additional advantages.

One development provides that the at least one operator control element has in each case a touch-sensitive screen, that is to say a touchscreen. Two operator control elements of this type (in particular precisely two) may be provided. The control device is designed to display at least one pixel-based graphic activation unit or one graphic operator control interface on the screen (that is to say, for example, an icon or a graphic slide control or what is referred to as a button), and to receive a user input in each case via the operator control interface. The activation units in the form of graphic operator control interfaces are therefore presented on a touch display or touchscreen. This provides the advantage that different operator control interfaces can be presented alternately, as a result of which the space which is available on each operator control element can be utilized more efficiently.

One development provides that the at least one operator control element is surrounded at least in regions by a housing of the control panel module in such a way that a gap is formed between the housing and the operator control element. The housing therefore cannot be moved or conversely, each operator control element can be moved with respect to the housing in that the respective operator control element is moved along the vehicle longitudinal direction in the described fashion. A gap width of the gap is therefore defined by the current position of the respective operator control element, wherein a comfort device of the motor vehicle is designed to act through the gap into the passenger compartment of the motor vehicle. The wider the gap, the more influence the comfort device has on the passenger compartment. Conversely, with a relatively small gap width the comfort device has less influence on the passenger compartment. The smallest gap width results here, in particular, if each operator control element is arranged in the enable position. The further each operator control element is moved away from the enable position toward the driver's seat, the greater, in particular, the gap width is then. This provides the advantage that when the control panel module is in use and each operator control element is moved out of the enable position into a position of use, the comfort device also acts into the passenger compartment. As a result, the setting of the gap width is therefore combined with the setting of the position of each operator control element.

Therefore, according to one development there is provision that the comfort device may be a ventilation device, and a cross section, through which there can be a flow, of an air outlet region of the ventilation device is defined by the gap width. As a result, each operator control element is therefore used as a valve element for the air outlet region in an installation space-saving manner. Additionally or alternatively to this, there can be provision that the comfort device may be an ambient lighting device which radiates light out of the gap into the passenger compartment. Ambient lighting device is intended to mean here that what is referred to as a spotlighting device or targeted, directional lighting of a predetermined region is not provided but rather light is input in a diffuse fashion and/or indirectly into the passenger compartment. For this purpose, a diffuser device can be provided, for example a roughened and/or clouded surface through which the light is radiated into the passenger compartment. The quantity of light is advantageously set here by setting the at least one operator control element.

One development provides that the at least one operator control element is mounted so as to be displaceable in a translatory fashion exclusively along the vehicle longitudinal direction. This provides the advantage that a joint or gap which runs all around the operator control element can be made available. As an alternative to this, one development provides that the at least one operator control element is mounted so as to be pivotable in each case about a rotational axis. As a result, the operator control element can be pivoted in a pivoting movement toward the steering wheel, and as a result at the same time the outer or distant end of each operator control element with respect to the steering column is made to approach the steering handle. One development provides that the at least one operator control element is mounted so as to be rotatable about itself in each case about a rotational axis which is oriented parallel to a vehicle transverse direction. As a result, an operator control interface of the operator control element can be stowed and therefore protected against mechanical damage.

One development provides that the at least one operator control element is configured as a plunger part or piston part which can be moved into a housing of the control panel module and moved out of the housing. As a result, for example, the described gap which runs around can be made available. A further advantage of a rigid plunger part is that it has a rigid surface for making available activation units or for bearing such activation units. For example, it can be configured as a carriage part which can slide out of the housing and slide into the housing. The plunger part can therefore be moved like a gondola in the housing. One development provides that an entire operator control front panel is formed to the left and right next to the steering column by a single plunger part which can be moved out of the housing of the control panel module along the vehicle longitudinal direction and back into the enable position. As a result, all the activation units made available by the control panel module retain their relative position with respect to one another independently of the current position of the operator control element.

As an alternative to this, one development provides that the at least one operator control element is held, by a flexible, transparent cover panel, on a central part of the control panel module, with the result that each operator control element constitutes a wing element which can pivot about a rotational axis. A jointless optical system can be made available by a uniform transparent cover panel which can cover the entire visible front panel of the control panel module. This optical system can be retained even if the at least one operator control element, i.e. in every position of the at least one operator control element. It is therefore possible, for example, to make available two operator control elements respectively one on the right and one on the left next to the steering column (from the driver's point of view or the point of view of the driver's seat) which are connected by a central part as a bridge element, wherein the operator control elements and the central part are covered by the same jointless cover panel. For example a touch-sensitive screen of each operator control element can be bonded on as a layered structure to the cover panel.

With respect to the described central part or bridge part, one development provides that in the central part the cover panel is held in a flexurally rigid fashion, e.g. by a support element, and the respective rotational mounting of the at least one operator control element is formed by the cover panel itself in that the respective rotational axis of the at least one operator control element is arranged in a surface of the cover panel, and the surface is oriented inclined with respect to a vehicle vertical axis. A normal vector of the surface therefore points obliquely upward. By moving out or moving the end of each operator control element which is turned away or remote from the steering column, the operator control element is then pivoted upward about this rotational axis in the vehicle longitudinal direction and at the same time in the direction of the vehicle vertical axis here, as a result of which the end assumes a position of use which is particularly favorable for operator control.

As an alternative to this, one development provides that the cover panel is held in a flexible fashion in the central part, that is to say is not held in a flexurally rigid fashion by a support element but rather, for example, is held only at two suspended elements, with the result that in this development the cover panel also bends in the central part when the at least one operator control element is moved out of the enable position into a position of use. This provides the advantage that the cover panel is protected against fracture, since larger bending radii are produced than in the case of a central part which is held in a flexurally rigid fashion. A further advantage here is that a virtual bending axis or rotational axis which is arranged freely in the space can be implemented, which axis is produced outside the surface of the cover panel, in particular between the cover panel and the vehicle seat. As a result, even when the surface of the cover panel is inclined it is possible to implement pivoting of each operator control element exclusively in a horizontal plane, that is to say without requiring a change of the position of the operator control element with respect to the vehicle vertical axis if repositioning between two positions is carried out.

In order to define the rotational axis there is provision, in particular, that the cover panel is held as a respective suspended element by at least two clips, in particular, however, by precisely two clips. This has proven to be a particularly low-cost suspended element for the cover panel for implementing a desired rotational axis profile.

With respect to the control of the actuator device for moving or adjusting the at least one operator control element there is a development which provides that the control device is designed to receive, as an enable signal, an ignition-off signal and/or an activity signal of an autopilot. Therefore, when shutting down or switching off the motor vehicle and/or when activating an autopilot when the operator control over the at least one operator control element is not necessary, the enable position can be adopted, with the result that more space is available to the driver.

Additionally or alternatively to this, the control device can be designed to receive, as the at least one position signal for setting a position of use of the at least one operator control element outside the enable position, an ignition-on signal and/or an approach signal. When the motor vehicle is switched on, a position of use for the use of the at least one operator control element is therefore assumed. The approach signal signals an approach of a hand of a person to the at least one operator control element. As a result, when the hand approaches the at least one operator control element, this operator control element is therefore moved out of the enable position closer to the person's hand. Additionally or alternatively, a seat position signal of a driver's seat can also be received. Therefore, if a person adjusts the driver's seat, the position of use of the at least one operator control element is also correspondingly adapted by a corresponding position signal. This therefore results in a position of use of the at least one operator control element as a function of a sitting position of the driver's seat. Instead of adaptation as a function of an approach signal it is also possible to provide that when at least one operator control element is arranged in the enable position a gesture operator control for operating the activation units which are made available via the at least one operator control element is active.

One development relates to the problem that in contemporary motor vehicles at least one steering column lever is arranged on the steering column of the motor vehicle between the steering handle and the front windshield. The steering column lever can be in the way if the at least one operator control element is present. The development therefore provides that an entire intermediate space between the steering handle and the at least one operator control element is configured so as to be blockage free, that is to say in particular a steering column lever is not arranged on the steering column. Instead, at least one wing switching element, that is to say for example a toggle switch with an actuating wing, or at least one steering column lever element, is arranged on the steering handle itself, that is to say for example the steering wheel, on a side facing the at least one operator control element. Since the steering column lever element and/or the at least one wing switching element is arranged on the steering handle itself, this element rotates along in each case when the steering handle is rotated. This is a decisive difference from the steering column lever which is arranged on a steering column and therefore does not rotate along with the steering handle. As a result of these developments it is made possible for the driver always to grasp around the steering handle to the at least one operator control element without his finger being blocked by a steering column lever.

As already stated, the control panel module for the motor vehicle is included. The control panel module has the at least one operator control element which has, in each case on one side, a recess for arranging the control panel module on a steering column of the motor vehicle. The at least one operator control element is arranged in each case so as to be rotatable about a rotational axis and/or so as to be movable at least along a predetermined movement direction, wherein this movement direction corresponds to the vehicle longitudinal direction in the correct installation state of the control panel module in the motor vehicle. An actuator device of the control panel module is made available for respectively moving the at least one operator control element, wherein the control device of the control panel module is designed to move, by actuating the actuator device, the at least one operator control element out of a housing of the control panel module in each case as a function of at least one enable signal, into a predetermined enable position, and as a function of at least one position signal, out of the enable position and into a position of use which corresponds to the position signal.

When a person is seated in a driver's seat of the motor vehicle, at least one predetermined use situation is detected, and when a use situation is detected at least one operator control element, arranged on a respective side next to a steering column of the motor vehicle, of a control panel module is moved toward the person and/or turned toward the person, and wherein at least one predetermined enable situation is detected, and when an enable situation is detected the at least one operator control element is moved away from the person into an enable position and/or turned away from the person, with the result that more movement space for the person is provided. For example, the switching off of the motor vehicle and/or the opening of a vehicle door or the activation of an autopilot can be detected as an enable situation. The driver is therefore advantageously provided with more movement space if he requires it according to the defined enable situation. A use situation can be detected precisely in this way, and when the use situation is detected the at least one operator control element can be moved out of the enable position back closer toward the person and/or turned toward the person. Starting of the motor vehicle and/or deactivation of an autopilot of the motor vehicle is e.g. such a use situation.

The developments of the method include features such as have already been described in conjunction with the developments of the motor vehicle. For this reason, the corresponding developments of the method are not described again.

BRIEF DESCRIPTION OF THE DRAWINGS

These and other aspects and advantages will become more apparent and more readily appreciated from the text which follows, in which exemplary embodiments are described. In the drawings:

FIG. 10 shows a schematic illustration of an embodiment of the motor vehicle with rotatably arranged operator control elements in the enable position, and FIG. 11 shows a schematic illustration of the embodiment from FIG. 10 with the operator control elements in a position of use.

DETAILED DESCRIPTION OF THE PREFERRED EMBODIMENT

Figure 1:
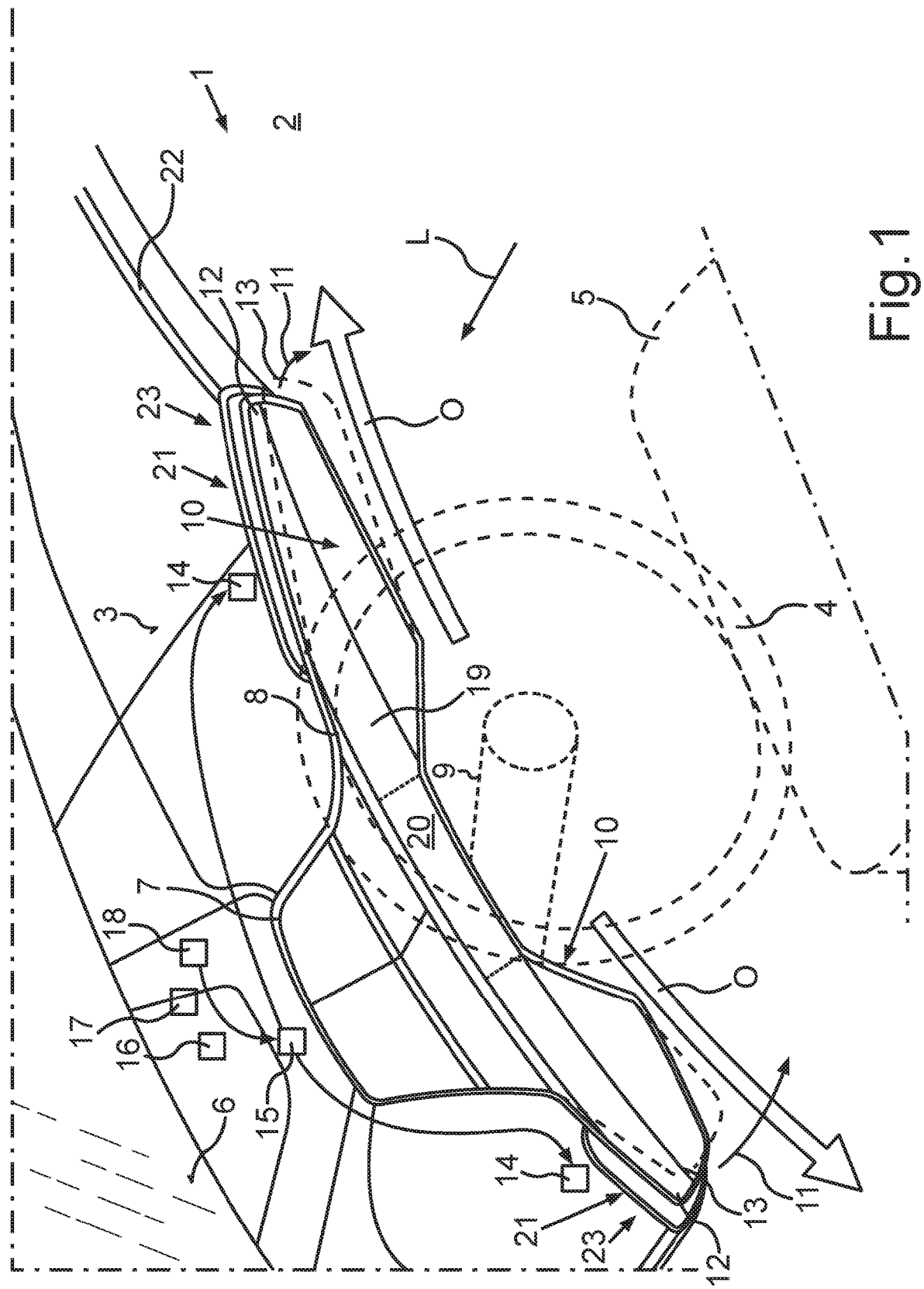
FIG. 1 shows a schematic illustration of a dashboard of an embodiment of the motor vehicle with a control panel module.

In the exemplary embodiments explained in the text which follows, the described components of the embodiments each represent individual features which are to be considered independently of one another and which each may be developed independently of one another and therefore are also to be considered individually or in another combination than that shown. Furthermore, the described embodiments can also be supplemented by further features which have already been described.

In the drawings, functionally identical elements are each provided with the same reference symbols.

FIG. 1 shows a passenger compartment 2 of a motor vehicle 1. The motor vehicle 1 can be, for example, a car, in particular a passenger car. For the sake of better orientation, FIG. 1 illustrates a vehicle longitudinal direction L, wherein the illustrated arrow points from the rear of the vehicle to the front of the vehicle. A dashboard 3, a steering wheel 4, a driver's seat 5 and a windshield or front windshield 6 are illustrated. The steering wheel 4 represents a steering handle. From the point of view of a driver (not illustrated) in the driver's seat 5, a combination instrument 7 is located behind the steering wheel 4. Furthermore, a control panel module 8, by which not only a steering column 9 of the steering wheel 4 but also two touch-sensitive screens or touchscreens 10 are made available, is installed in the dashboard 3. A housing of the control panel module 8 is concealed by the dashboard 3.

Each touchscreen 10 represents an operator control element. Each touchscreen 10 can be moved out of the housing by a movement 11 between an enable position 12 and a position of use 13 which is arranged closer to the driver's seat 5 and/or steering wheel 4 with respect to the enable position 12. In precisely this way, each touchscreen 10 can be moved from the position of use 13 back into the enable position 12. In order to move the touchscreen 10, an actuator device 14 is made available which can generate, for example on the basis of an electric motor and/or a threaded spindle, the motor-powered movement 11 which is required to move each touchscreen 11 out and in.

The actuator device 14 is controlled by a control device 15 of the control panel module 8. The control device 15 can be implemented, for example, on the basis of a microcontroller or microprocessor. The control device 15 sets the enable position 12 by the actuator device 14 if the control device receives a predetermined enable signal 16 from another vehicle component 18. The other vehicle component 18 can be, for example, a control unit which detects a corresponding enable situation which requires the setting of the enable position 12. A corresponding enable situation can be defined in the way already described. The control device 15 sets the position of use 13 if it receives a corresponding position signal 17 from the vehicle component 18. The vehicle component 18 can generate the position signal 17 if it detects a corresponding use situation which can also be defined in the way already described. The control device 15 may detect the position in which the touchscreen 10 has to be placed automatically. A mechanical key or a sensor key or some other touch element can also be made available so that the user can set the position of the touchscreens 10 himself.

The two touchscreens 10 can be connected here overall by a cover panel 19, through which the driver can see the touchscreens 10. The covering by a common cover panel 19 produces overall a curved, joint-free surface O by the two touchscreens 10 and a central part 20.

Each touchscreen 10 can be arranged in front of an air outlet area 21 of a ventilation device of the motor vehicle 1. There can be provision to make available an ambient light 22 which provides a light source in the air outlet region 21 behind the touchscreens 10. A gap 23, whose gap width is set or changes with the position of the touchscreens 10 by the movement 11, is formed between the air outlet region 21 and the touchscreens 10. The gap 23 is bounded by the housing of the control panel module 8 on one side, and by the respective touchscreen 10 on the other side.

Figure 2:
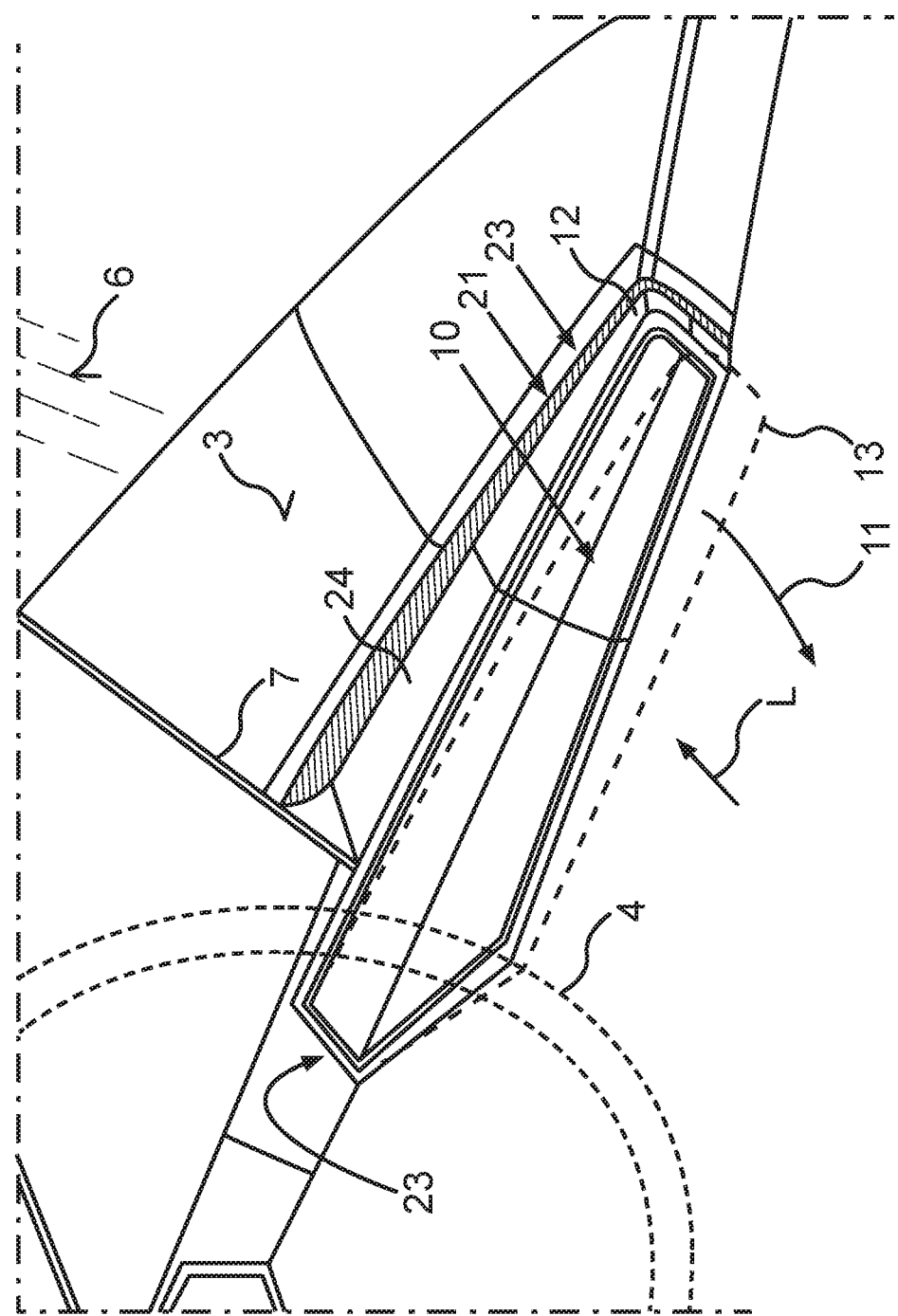
FIG. 2 shows a schematic illustration of an alternative embodiment of the control panel module.

FIG. 2 shows an alternative configuration of a touchscreen 10, by which configuration a gap 23 which runs all around each touchscreen 10 can be produced. In this context, the touchscreen 10 is configured as a gondola or plunger part 24 which can move in a purely translatory fashion along the vehicle longitudinal direction L.

Figure 3:
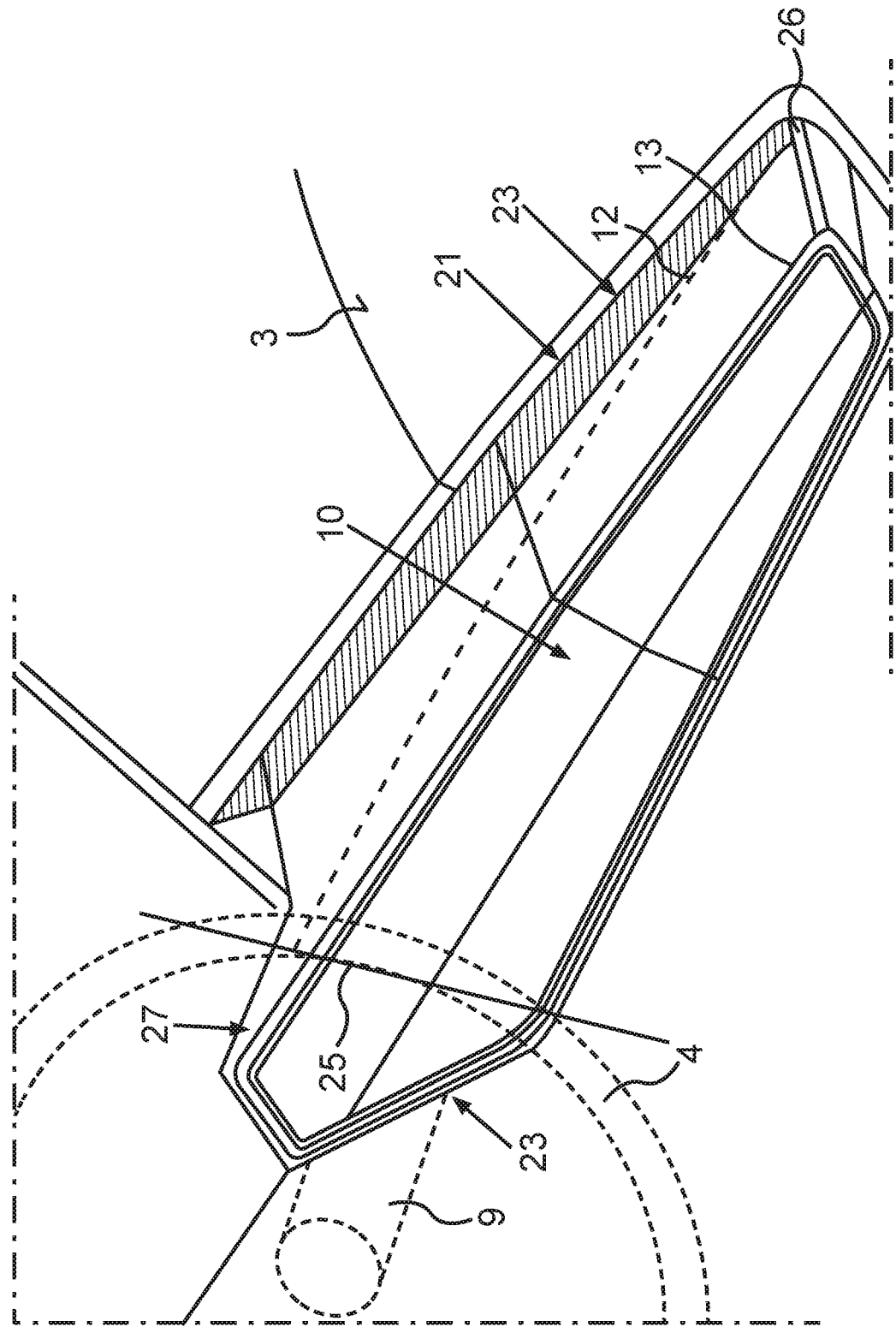
FIG. 3 shows a schematic illustration of a further alternative embodiment of the control panel module.

FIG. 3 illustrates how the touchscreen 10 can be mounted so as to rotate about a rotational axis 25, with a result that one end 26, which represents a remote end of the touchscreen 10 starting from the steering column, carries out a larger movement during the movement 11 than an end 27 which is near to the column.

Figure 4:
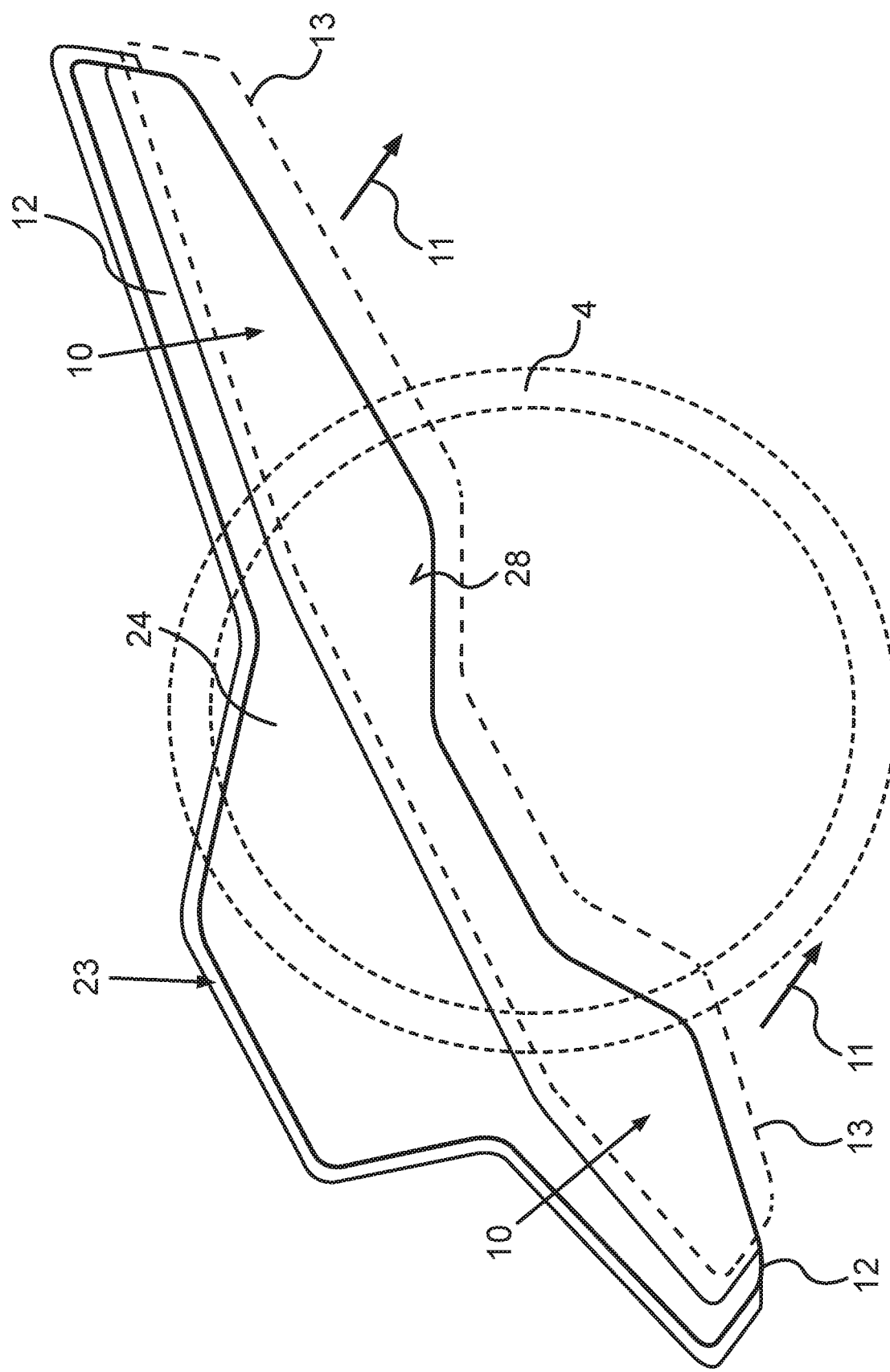
FIG. 4 shows a schematic illustration of a further embodiment of the control panel module.

FIG. 4 illustrates an embodiment in which a single plunger element 24 is provided which bears both touchscreens 10. It is also possible to provide that a single touchscreen is provided which extends over an entire front region 28 which faces the driver's seat 5.

Figure 5:
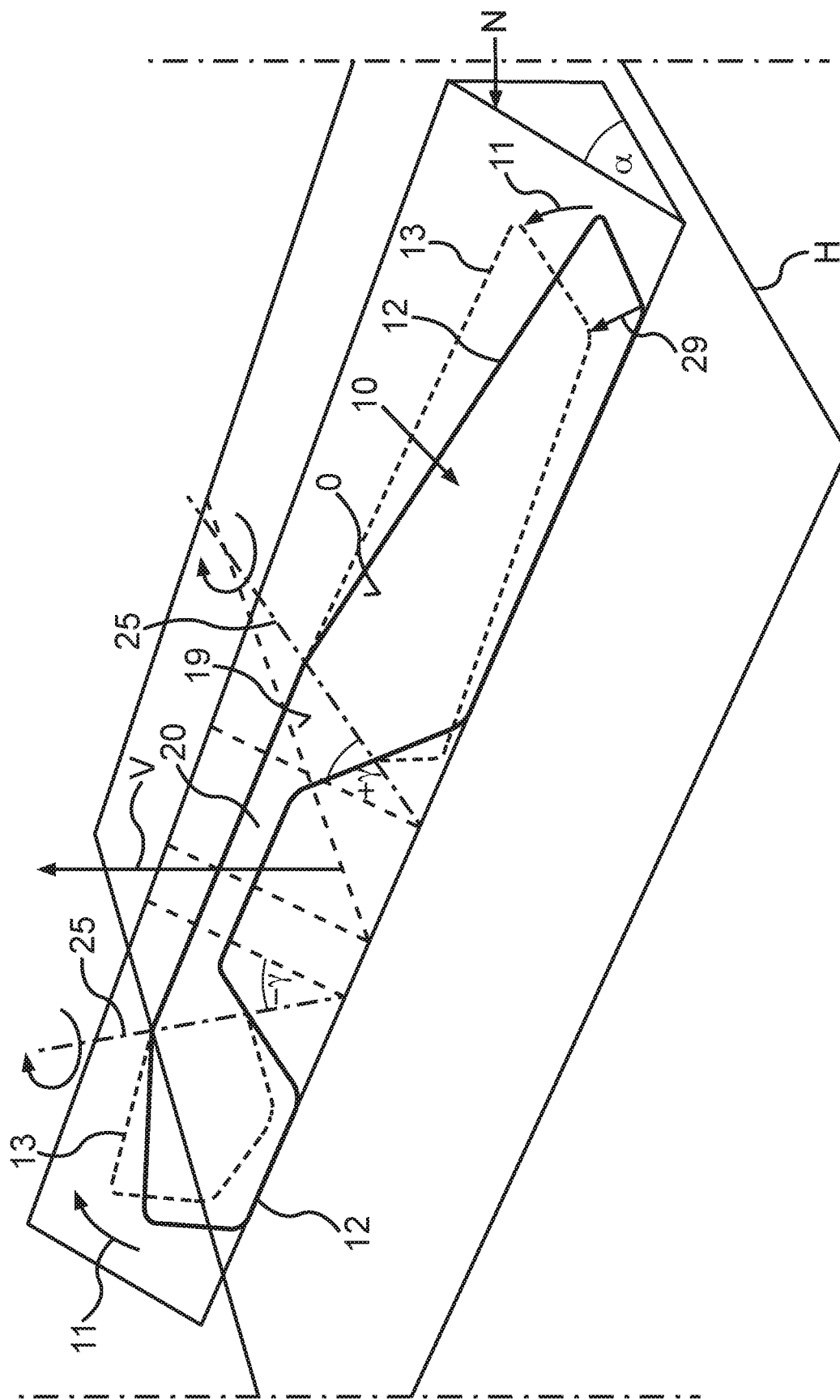
FIG. 5 shows a schematic illustration of a further embodiment of the control panel module with a cover panel and pivotable operator control element.

FIG. 5 illustrates how a rotational axis 25, which is located in a plane of the surface O of the cover panel 19, can be formed by the cover panel 19 and a central part 20, mounted in a flexurally rigid fashion, for each touchscreen 10. For the purpose of visual orientation, the inclination N of the inclined surface O is also restricted. If only the inclination N about the angle α with respect to a vertical V is provided, there is a vertical portion 29 as a result of the inclination N of the rotational axis 25 with respect to the vertical V, that is to say with respect to the direction of the vehicle vertical axis, as a result of the movement 11, with the result that the touchscreens 10 lift off from a horizontal plane H with respect to the enable position 12 in the position of use 13. If this is not desired, the rotational axis 25 can be additionally laterally inclined or rotated by the angle γ, as a result of which the touchscreens 10 do not lift off from the plane H during the movement 11.

Figure 6:
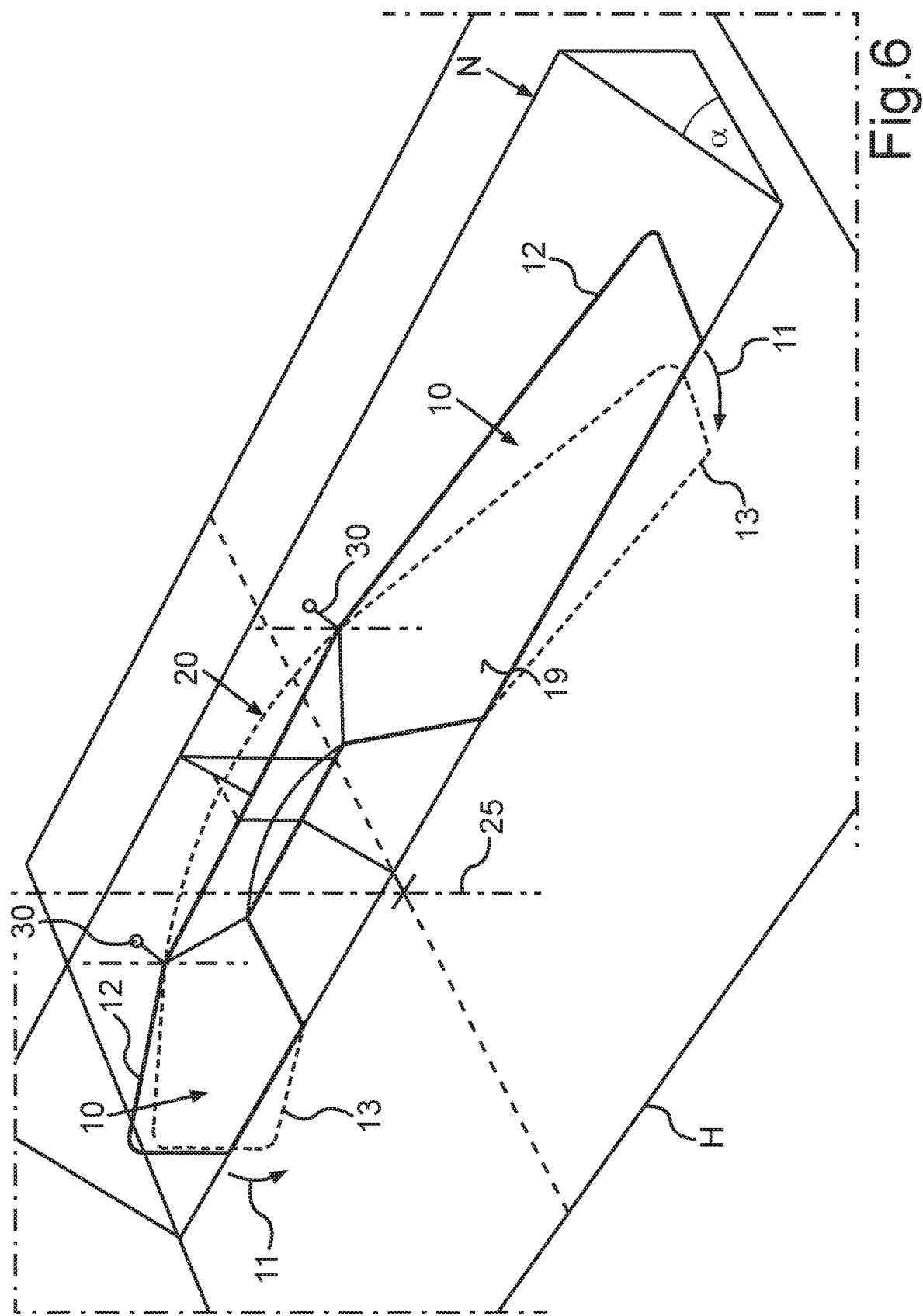
FIG. 6 shows a schematic illustration of a further embodiment of the control panel module, wherein a central part of the cover panel is mounted in a flexible fashion.

FIG. 6 illustrates, in contrast thereto, how a virtual rotational axis 25 can be implemented by a central part 20 which is held in a pliable or flexible fashion. The suspended element 30 which is necessary for this can be arranged on the cover panel 19 for example at the junctions between the central part 20 and the two touchscreens 10.

Figure 7:
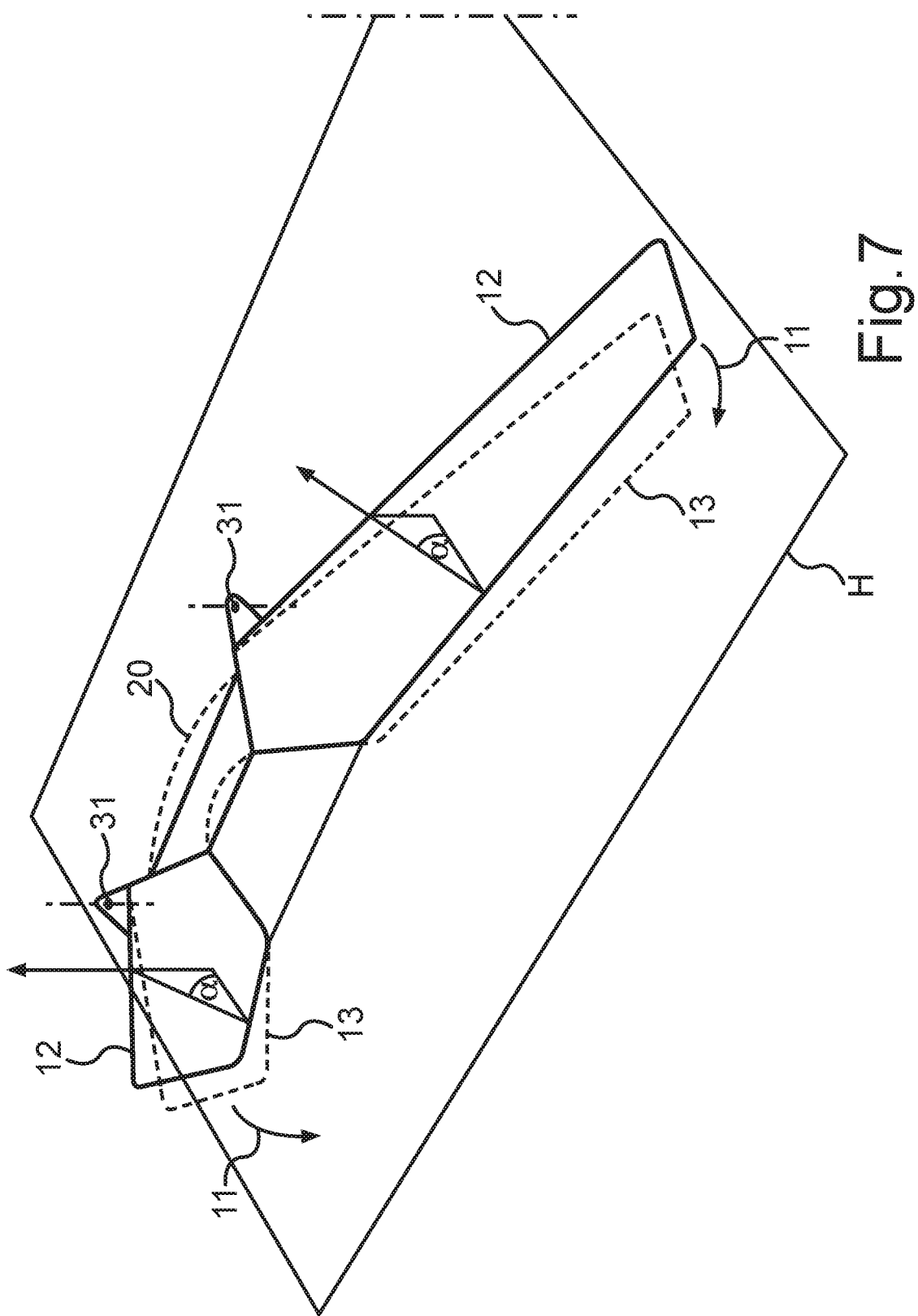
FIG. 7 shows a schematic illustration of the control panel module from FIG. 6 with illustration of clips for securing rotational axes of the cover panel.

A possible implementation of the suspended element 30 is illustrated in FIG. 7. It is shown here how the cover panel 19 can be held by two clip elements 31 as a suspended element 30. The angle α with respect to the horizontal plane H is not changed by the movement 11 which is exclusively horizontal.

Therefore, in the case of the motor vehicle 1 overall, lateral touch displays or touchscreens 10, which can move, are made available to the left and right of the steering wheel 4. This can be useful for improving the visual appeal of the dashboard 3, improving the ergonomy when getting in and out of the vehicle and when driving (as a function of the sitting position and/or body sizes) and improving the ergonomy and the sensation of space during pilot driving. As a result of the adaptation of the position of each touchscreen 10 there is no need to adjust the position of the touchscreens 10 for different driving situations. The position of each touchscreen 10 can be adapted at any time by the movement 11 and the opposing movement.

The touchscreen 10 to the left of the steering wheel 4 (from the point of view of the driver's seat 5) can be provided, for example, for light functions and/or driving assistance functions by displaying corresponding graphic operator control interfaces on the touchscreen 10. The touchscreen 10 to the right of the steering wheel can be provided for the operator control of the infotainment system and/or the air conditioning device. Here, corresponding graphical operator control interfaces can be displayed on the touchscreen 10. The touchscreens may have their rotational axis 25, about which they can rotate, in the region of the end 27 near to the column. The outer ends 26 are therefore moved toward the steering wheel 4 when each touchscreen 10 is moved out of the enable position 12 into the position of use 13.

In the position of use 13, each touchscreen 10 is moved toward the steering wheel 4, which makes it easier to reach each touchscreen 10 when steering the motor vehicle by the steering wheel 4. By making available gondolas or plunger elements which are arranged freely in the housing of the control panel module 8, an all-round movement joint is made possible. Displacement of the two touchscreens 10 by a single-piece plunger part (FIG. 4) makes an air nozzle possible, which also permits air to be blown head on onto the driver.

A common planar covering glass in the form of the cover panel 19 provides the advantage that no vertical joints arise or are present in the steering wheel region in the front area 28.

As is illustrated in FIG. 6 and FIG. 7, the covering glass can be folded like a piece of origami in order to be pivoted in the region of the steering wheel 4 between enable position 12 and the position of use 13.

Figure 8:
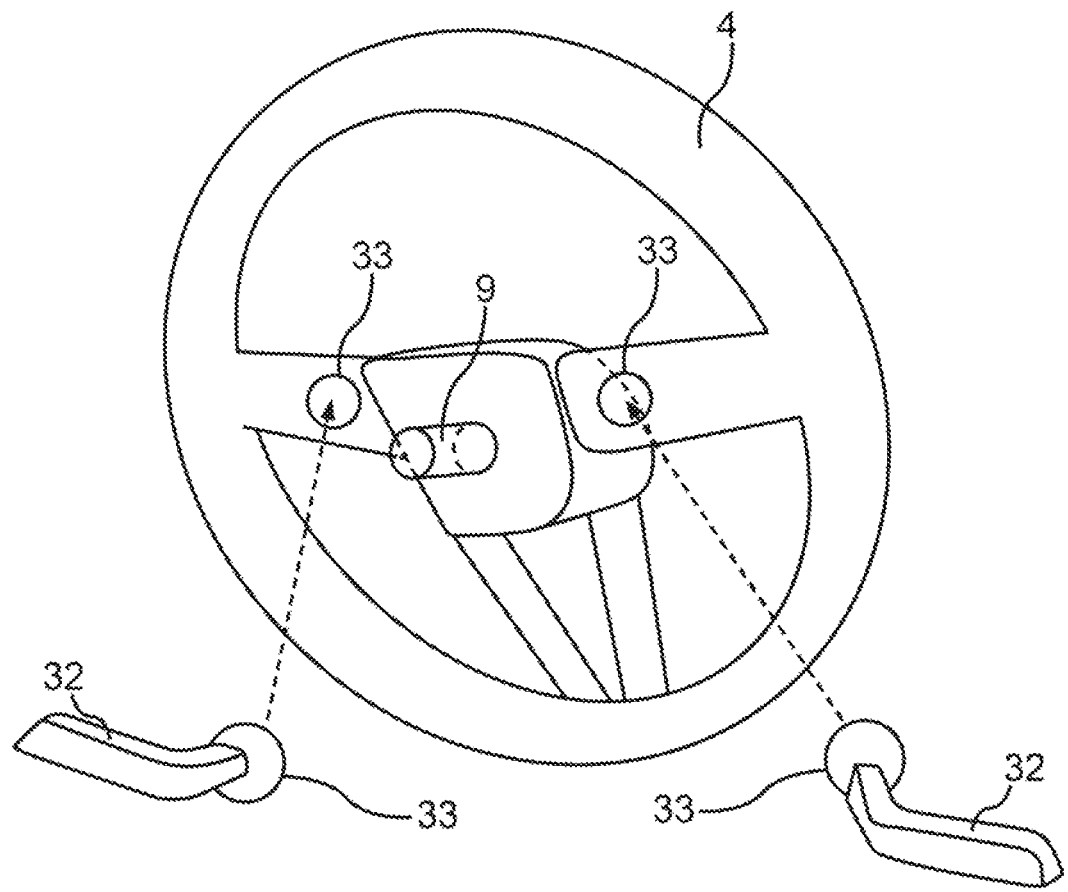
FIG. 8 shows a schematic exploded drawing of a rear view of a steering handle, i.e. a side of the steering handle facing away from the driver.
Figure 9:
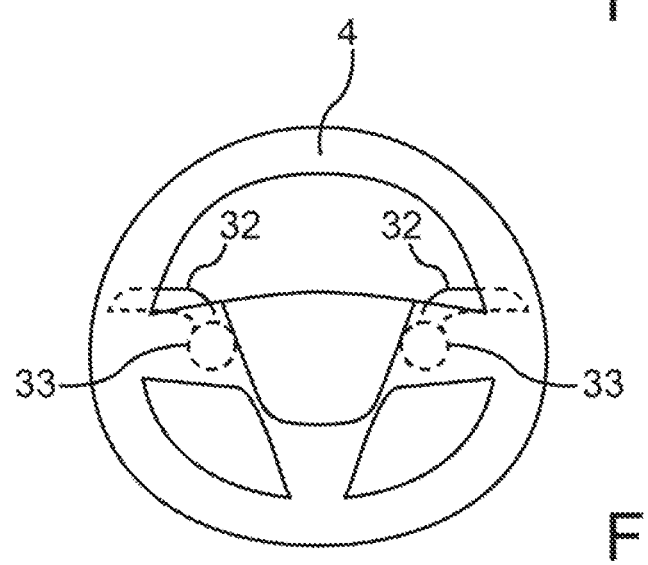
FIG. 9 shows a schematic illustration of the steering handle from the driver's point of view.

FIG. 8 and FIG. 9 show the steering wheel 4 in isolation. On a side facing away from the driver, steering column elements 32 can be held e.g. by ball-and-socket joints 33.

FIG. 10 and FIG. 11 show a dashboard 3 with touchscreens 10 which are rotated by the movement 11 about a rotational axis 34 between an enable position 12 (shown in FIG. 10) and a position of use 13 (shown in FIG. 11). The movement 11 can be guided by a rail or slotted guide system 35.

In the enable position 12, each touchscreen 10 is turned away from the driver, while in the position of use 13 it is turned toward the driver. It is possible also to make available a small touchscreen or screen 10' on each rotatable operator control element with a touchscreen 10, the small touchscreen or screen 10' being able to be used to output information to the driver in the enable position 12 of the touchscreen 10 instead of the touchscreen 10.

Overall, the control panel module or the front side 28 is configured in a simpler and more elegant way. When a person gets in or out of the vehicle, the touchscreens 10 and optionally also the steering wheel 4 itself can be pulled back, that is to say moved away from the driver's seat 5. As a result, more space or freedom of movement is produced. The touchscreens 10 can also be moved toward the driver's seat 5 if an approaching of a hand to the touchscreens is detected by the vehicle component 18. The touchscreens 10 can also be set with respect to their position as a function of the sitting position of the driver's seat, with the result that more than one position of use 13 is defined. The sitting position can be detected by the component 18.

In the case of piloted driving, that is to say if operator control of the touchscreens 10 is not expected or necessary, the touchscreens 10 can be moved away from the driver's seat 5 into the enable position 12, with the result that more space to move is available in the passenger compartment 2. In this state, the touchscreens 10 can be operated, for example, by gestures, wherein a gesture operator control can be implemented, for example, by the vehicle component 18. Approach detection is also possible here in order to move the touchscreens 10 back into a position of use 13 again.

Overall, the example shows how movable lateral touch displays can be made available on the instrument panel.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A control panel module for a motor vehicle having a steering column in a passenger compartment, comprising:
 a housing;
 a central part;
 at least one operator control element, each arranged on a side of a recess for arranging the control panel module and the steering column of the motor vehicle, and at least one of rotatable about a first rotational axis and movable at least along a predetermined movement direction;
 an actuator device configured to respectively move the at least one operator control element;
 a control device configured to move, by actuating the actuator device, the at least one operator control element out of the housing of the control panel module, in response to at least one enable signal, into an enable position in which the passenger compartment is maximized and, in response to at least one position signal, out of the enable position and into a position of use corresponding to the position signal; and
 a flexible, transparent cover panel holding the at least one operator control element on the central part of the control panel module as a wing element pivotable about a second rotational axis, the flexible, transparent cover panel being held in a flexible fashion in the central part, and the second rotational axis being oriented in a virtual fashion, freely in space.

2. The control panel module as claimed in claim 1,
 wherein each of the at least one operator control element has a touch-sensitive screen, and
 wherein the control device is configured to display at least one pixel-based, graphic operator control interface, and to receive a user input via the operator control interface.

3. The control panel module as claimed in claim 1,
 wherein each of the at least one operator control element is surrounded at least in regions by the housing with a gap formed between the housing and the operator control element, the gap having a gap width defined by a current position of the operator control element, and
 wherein a comfort device of the motor vehicle is configured to act through the gap into the passenger compartment.

4. The control panel module as claimed in claim 3, wherein the comfort device includes at least one of
 a ventilation device having an air outlet region with a cross section, through which there can be a flow, defined by the gap width, and
 an ambient lighting device configured to radiate light out of the gap into the passenger compartment.

5. The control panel module as claimed in claim 1, wherein each of the at least one operator control element is mounted so as to be at least one of
 displaceable in a translatory fashion exclusively along a vehicle longitudinal direction, and
 rotatable about the first rotational axis oriented parallel to a vehicle transverse direction.

6. The control panel module as claimed in claim 1, wherein the at least one operator control element is configured as a plunger part movable into the housing of the control panel module and out of the housing.

7. The control panel module as claimed in claim 1, wherein the cover panel is held as a suspended element by at least two clip elements and defines the second rotational axis.

8. The control panel module as claimed in claim 1, wherein the motor vehicle has a driver's seat,
 wherein the control device is configured to receive, as the at least one enable signal, at least one of an ignition-off signal and an activity signal of an autopilot, and/or
 wherein the control device is configured to receive, as the at least one position signal, at least one of an ignition-on signal, an approach signal signaling an approaching hand of a person to the at least one operator control element and a seat position signal of the driver's seat.

9. The control panel module as claimed in claim 1, wherein the motor vehicle has a steering handle and one of at least one wing switching element and at least one steering column lever element mounted on the steering column,
 wherein an entire intermediate space between the steering handle and the at least one operator control element is configured to be blockage free, and
 wherein the one of the at least one wing switching element and the at least one steering column lever element respectively rotates along with the steering handle whenever the steering handle rotates to steer the motor vehicle and is arranged on the steering handle on a side facing the at least one operator control element.

10. A motor vehicle, comprising:
 a steering handle on a steering column;
 a windshield;
 a driver's seat; and
 a control panel module arranged between the steering handle and the windshield, including
  a central part;
  at least one operator control element, each arranged on one side next to the steering column of the steering handle and at least one of rotatable about a first rotational axis and movable at least along a vehicle longitudinal direction of the motor vehicle with respect to the driver's seat,
  an actuator device configured to respectively move the at least one operator control element,
  a control device configured to move, by activating the actuator device, the at least one operator control element, in response to at least one enable signal, into an enable position in which the passenger compartment is maximized, and, in response to at least one position signal, out of the enable position and into a position of use corresponding to the position signal, and
  a flexible, transparent cover panel holding the at least one operator control element on the central part of the control panel module as a wing element pivotable about a second rotational axis, the flexible, transparent cover panel being held in a flexible fashion in the central part, and the second rotational axis being oriented in a virtual fashion, freely in space.

11. The motor vehicle as claimed in claim 10,
 wherein each of the at least one operator control element is surrounded at least in regions by the housing with a gap formed between the housing and the operator control element, the gap having a gap width defined by a current position of the operator control element, and
 further comprising a comfort device of the motor vehicle configured to act through the gap into the passenger compartment.

12. The motor vehicle as claimed in claim 11, wherein the comfort device includes at least one of
   a ventilation device having an air outlet region with a cross section, through which there can be a flow, defined by the gap width, and
   an ambient lighting device configured to radiate light out of the gap into the passenger compartment.

13. The motor vehicle as claimed in claim 10, wherein each of the at least one operator control element is mounted so as to be at least one of
   displaceable in a translatory fashion exclusively along the vehicle longitudinal direction, and
   rotatable about the first rotational axis oriented parallel to a vehicle transverse direction.

14. The motor vehicle as claimed in claim 10, wherein the at least one operator control element is configured as a plunger part movable into and out the housing of the control panel module.

15. The motor vehicle as claimed in claim 10,
   further comprising a driver's seat, and
   wherein the control device is configured to receive at least one of
     an ignition-off signal and an activity signal of an autopilot, as the at least one enable signal, and
     an ignition-on signal, an approach signal signaling an approaching hand of a person to the at least one operator control element and a seat position signal of the driver's seat, as the at least one position signal.

16. The motor vehicle as claimed in claim 10,
   further comprising:
     a steering handle; and
     at least one of
       at least one wing switching element, and
       at least one steering column lever element mounted on the steering column,
   wherein an entire intermediate space between the steering handle and the at least one operator control element is configured to be blockage free, and
   wherein the at least one of the at least one wing switching element and the at least one steering column lever element respectively rotates along with the steering handle whenever the steering handle rotates to steer the motor vehicle and is arranged on the steering handle on a side facing the at least one operator control element.

17. A method for operating a motor vehicle, comprising:
   detecting, when a person is seated in a driver's seat of the motor vehicle, whether at least one predetermined use situation exists;
   moving and/or turning, when the at least one predetermined use situation is detected, at least one operator control element, arranged on a respective side next to a steering column of the motor vehicle, of a control panel module, toward the person seated in the driver's seat by at least one of moving relative to the driver's seat and rotating about a first rotational axis;
   detecting whether at least one predetermined enable situation exists;
   moving and/or turning, when an enable situation is detected, the at least one operator control element away from the person into an enable position in which passenger space of the motor vehicle is maximized, thereby providing more movement space for the person
   supporting the at least one operator control element by a flexible, transparent cover panel on a central part of the control panel module as a wing element pivotable about a second rotational axis; and
   holding the cover panel in a flexible fashion in the central part with the second rotational axis oriented in a virtual fashion, freely in space.

18. The method as claimed in claim 17,
   wherein each of the at least one operator control element is surrounded at least in regions by the housing with a gap formed between the housing and the operator control element, the gap having a gap width defined by a current position of the operator control element, and
   further comprising blowing air by a ventilation device of the motor vehicle through the gap into the passenger compartment.

19. The method as claimed in claim 17,
   wherein each of the at least one operator control element is surrounded at least in regions by the housing with a gap formed between the housing and the operator control element, the gap having a gap width defined by a current position of the operator control element, and
   further comprising radiating light from an ambient lighting device through the gap into the passenger compartment.

20. The method as claimed in claim 17, wherein each of said moving and/or turning includes at least one of
   displacing each of the at least one operator control element in a translatory fashion exclusively along the vehicle longitudinal direction, and
   rotating each of the at least one operator control element about a second rotational axis oriented parallel to a vehicle transverse direction.

21. The method as claimed in claim 17, wherein the at least one operator control element is configured as a plunger part movable into and out the housing of the control panel module.

* * * * *